G. N. CUMMINGS.
Spectacle Joint.
No. 20,046.
Patented April 27, 1858.
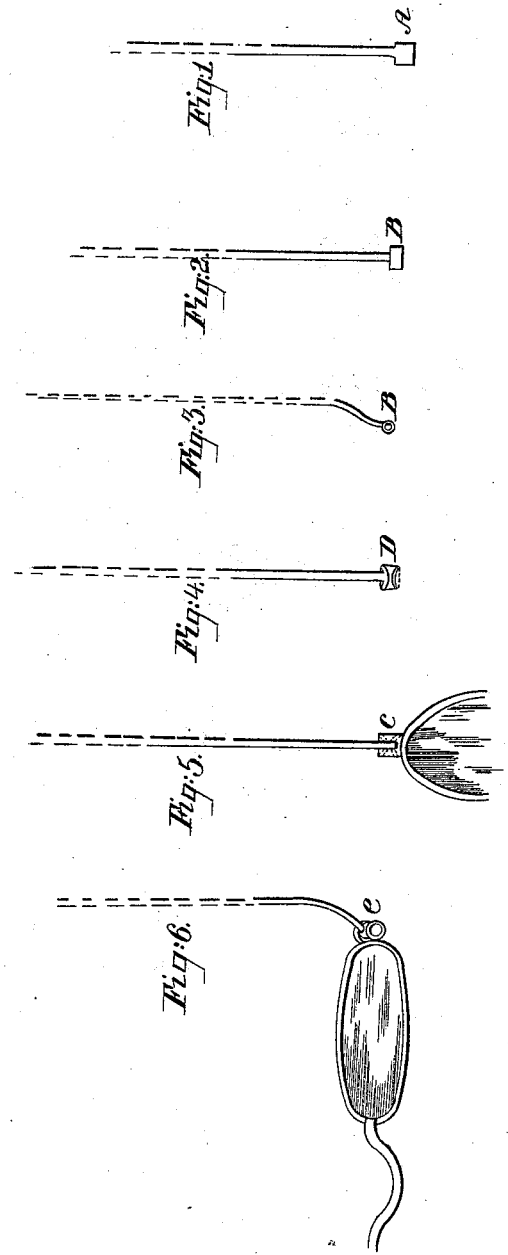

UNITED STATES PATENT OFFICE.

G. N. CUMMINGS, OF HARTFORD, CONNECTICUT.

JOINT FOR SPECTACLE-FRAMES.

Specification of Letters Patent No. 20,046, dated April 27, 1858.

*To all whom it may concern:*

Be it known that I, GEORGE N. CUMMINGS, of the city of Hartford, county of Hartford, and State of Connecticut, have invented a new and useful Improvement in the Mode of Constructing the Joints of Spectacle-Frames; and I do hereby declare that the following is a correct description thereof, reference being had to the accompanying drawing and to the letters of reference marked thereon.

The nature of my invention consists in the formation of an improved joint to the connection of the temple bow with the rim of the glass frame.

To enable others skilled in the art to make and use my invention I will proceed to describe its construction and operation.

*The drawing.*—Figure 1 is a part of the temple bow, first preparation. Fig. 2 is ditto, second preparation, front view. Fig. 3 is ditto, second preparation, end view. Fig. 4 is shape when formed in the joint. Fig. 5 is section of joint. Fig. 6 is view of ditto finished.

The general construction and form of the temple bow and rim of the glass frame are in the usual style.

I commence by forming the temple bow at the joint end, Fig. 1, A, with a flattened surface of the proper size to form the internal part of the joint as Figs. 2–3, B. I then form it into the cylinder shape as Figs. 2–3, B, preparatory to inserting the same into the holes of the projecting part of the glass frame C, Fig. 6, which are drilled out of the right size to receive the straight cylinders B but on the outside of the holes I with a proper instrument countersink the same to form it of a beveled or conical shape, D. The sides of the frame are now opened to allow the two cylinders B to pass in, they are then closed, and I then with a properly shaped beveled tool, press out each of the inserted cylinders till it fills up the beveled or countersunk part and forms a kind of conical shape cylinder, and prevents the separating of the glass frame, at the same time rotating freely, the same tool that opens the cylinders, mills off the ends smooth, thus making a firm, close and pleasant working joint, more economical in construction, and neater in appearance than the screw or riveted joint now commonly used.

What I claim as my invention and desire to secure by Letters Patent is—

The double conical shaped tube joint to spectacles, in the manner substantially as herein set forth and described.

G. N. CUMMINGS.

Witnesses:
 WM. VINE,
 HENRY C. ROBINSON.